Feb. 3, 1925.                                                1,524,891
J. H. SYKES
VEHICLE BODY
Filed Oct. 25, 1922
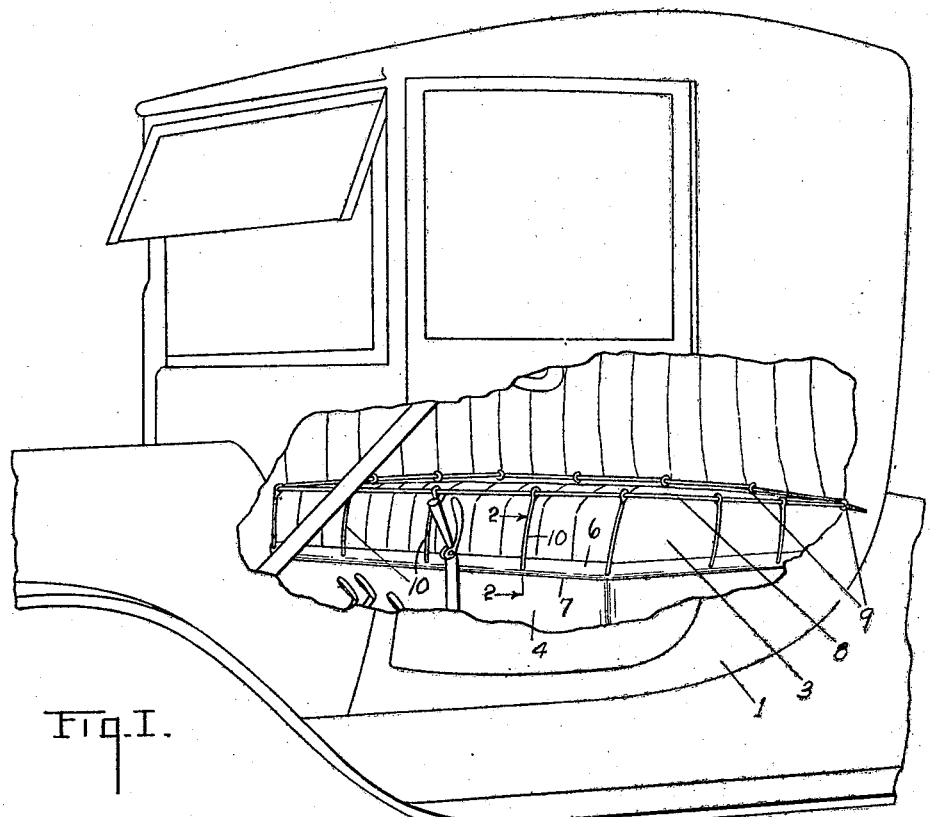
Fig. I.
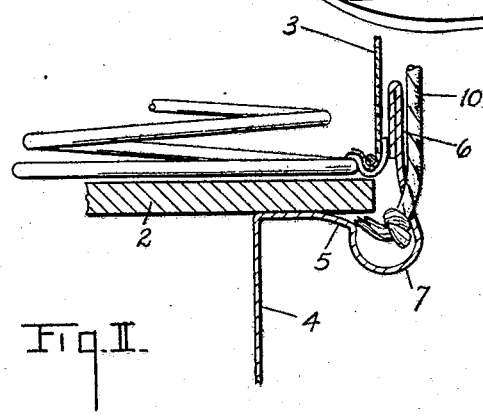
Fig. II.
Inventor
Jared H. Sykes
By Chappell Neal
Attorneys Patented Feb. 3, 1925.

1,524,891

UNITED STATES PATENT OFFICE.

JARED H. SYKES, OF BELLEVUE, MICHIGAN.

VEHICLE BODY.

Application filed October 25, 1922. Serial No. 596,801.

*To all whom it may concern:*

Be it known that I, JARED H. SYKES, a citizen of the United States, residing at Bellevue, county of Eaton, State of Michigan, have invented certain new and useful Improvements in Vehicle Bodies, of which the following is a specification.

This invention relates to improvements in vehicle bodies.

The main object of the invention is to provide an improved body for motor vehicles and the like in which means are provided whereby the occupant may hold himself to the seat, thereby reducing the liability of injury in the event of accidents or the like.

A further object is to provide handholds for the above purpose which are so associated with the seat as to be readily grasped and so that the occupant may hold himself to the seat with a minimum of physical effort.

Further objects, and objects relating to structural details will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this application, in which:

Fig. I is a perspective view of a motor vehicle equipped with my improvements, the vehicle body proper being shown mainly in conventional form.

Fig. II is an enlarged detail vertical section on a line corresponding to line 2—2 of Fig. I.

In the drawing similar reference numerals refer to similar parts in both views.

Referring to the drawing, 1 represents the vehicle body, 2 the seat, 3 the cushion and 4 the front wall of the seat.

In the embodiment illustrated the front wall 4 is of sheet metal and has an offset 5 at its upper end which terminates in an upwardly projecting cushion retaining flange 6. At the angle between the parts 5 and 6 is a downwardly projecting beadlike roll forming a handhold 7 which may be readily grasped by the occupant of the vehicle seated upon the cushion with arms fully extended, the advantage of this being that thus positioned the manifold does not in any wise interfere with the cushion and, further, one may hold himself very securely to the seat with arms extended.

I also provide a flexible handhold 8 which is disposed at the upper edge of the cushion or adjacent the plane of the top of the cushion. This handhold extends along the front, rear and ends of the cushion and is secured to the body at the rear of the cushion by means of the fasteners 9, while it is secured to the seat or the walls thereof by the flexible connections 10. This handhold is thus supported in a convenient position for grasping and being flexible it does not interfere with the springing of the cushion.

I have not illustrated or described other modifications or adaptations of my invention as I believe the disclosure made will enable those skilled in the art to which my invention relates to embody or adapt the same as may be desired.

Having thus described my invention, what I claim as new and desire to secure by Letters Patent, is:

1. The combination with a motor vehicle body of a seat therefor provided with a cushion, a front wall for said seat having a forwardly offset beadlike roll at the front edge of the seat constituting a handhold adapted to be grasped by the occupant for holding himself to the seat, a flexible handhold disposed at the upper edge of the seat at the front, rear and ends thereof, means for securing said flexible handhold to the body of the vehicle at the sides and back of the seat, and flexible connections for said flexible handhold to the seat at the base of the cushion.

2. The combination with a motor vehicle body of a seat therefor provided with a cushion, a flexible handhold disposed at the upper edge of the seat at the front, rear and ends thereof, means for securing said flexible handhold to the body of the vehicle at the sides and back of the seat, and flexible connections for said flexible handhold to the seat at the base of the cushion.

3. The combination with a motor vehicle body of a seat therefor provided with a cushion, a handhold disposed at the front of the seat below the cushion to be grasped by the occupant for holding himself to the seat, a flexible handhold disposed at the upper edge of the seat at the front, rear and ends thereof, means for securing said flexible handhold to the body of the vehicle at the sides and back of the seat, and flexible connections for said flexible handhold to the seat at the base of the cushion.

4. The combination with a vehicle body of a seat therefor provided with a cushion, a flexible handhold disposed at the upper edge of the seat and extending along the front ends and rear thereof, and means for supporting said handhold to resist an upward pull thereon.

In witness whereof, I have hereunto set my hand and seal.

JARED H. SYKES. [L. S.]